(12) United States Patent
Porter et al.

(10) Patent No.: US 7,680,699 B2
(45) Date of Patent: Mar. 16, 2010

(54) METHOD, SYSTEM, AND MEDIUM FOR SHARING DIGITAL CONTENT AND PURCHASING PRODUCTS AT LIVE PERFORMANCES

(75) Inventors: Dorrian Grant Porter, Menlo Park, CA (US); Andrew William Stack, Redwood City, CA (US); Adrian Jeremy Tymes, Mountain View, CA (US)

(73) Assignee: Mozes Oncorporated, Palo Alto, CA (US)

( * ) Notice: Subject to any disclaimer, the term of this patent is extended or adjusted under 35 U.S.C. 154(b) by 0 days.

(21) Appl. No.: 11/876,956

(22) Filed: Oct. 23, 2007

(65) Prior Publication Data

US 2009/0106117 A1   Apr. 23, 2009

(51) Int. Cl.
    *G06F 17/30* (2006.01)
(52) U.S. Cl. .......................................... 705/26; 705/27
(58) Field of Classification Search .................. 705/26, 705/27
    See application file for complete search history.

(56) References Cited

U.S. PATENT DOCUMENTS

| | | | | |
|---|---|---|---|---|
| 6,587,127 | B1 * | 7/2003 | Leeke et al. | 715/765 |
| 6,715,003 | B1 * | 3/2004 | Safai | 710/33 |
| 6,965,770 | B2 * | 11/2005 | Walsh et al. | 455/426.1 |
| 2003/0007464 | A1 * | 1/2003 | Balani | 370/310 |
| 2005/0080682 | A1 * | 4/2005 | Wilson | 705/26 |
| 2005/0251454 | A1 * | 11/2005 | Wood | 705/26 |
| 2006/0074808 | A1 * | 4/2006 | Boesen | 705/51 |
| 2006/0104600 | A1 * | 5/2006 | Abrams | 386/46 |
| 2006/0173701 | A1 * | 8/2006 | Gurvey | 705/1 |
| 2006/0242234 | A1 * | 10/2006 | Counts et al. | 709/204 |
| 2006/0271961 | A1 * | 11/2006 | Jacoby et al. | 725/46 |
| 2006/0276174 | A1 * | 12/2006 | Katz et al. | 455/410 |
| 2007/0032244 | A1 * | 2/2007 | Counts et al. | 455/456.1 |

OTHER PUBLICATIONS

Dictionary.com, 2006 http://dictionary.reference.com/browse/keyword.*
InfoWorld, Eric Hall, Feb. 2, 1998 p. 46 Music Retailer Finds Commerce in Communities N2K Boosts Traffic, Customer Loyalty with Special-Interest Community Sites.*

* cited by examiner

*Primary Examiner*—Jeffrey A Smith
*Assistant Examiner*—Matthew Zimmerman
(74) *Attorney, Agent, or Firm*—Turocy & Watson, LLP; Thomas E. Watson

(57) ABSTRACT

A content request, storage, and configuration system is provided for attendees of live events or performances, which associates pieces of content with one or more keywords, and configures the content for the benefit of a user. Content owners load content into the system or link content elsewhere to the system, and optionally designate a set of actions to be taken. Keywords are assigned to the content and actions by the system based on user input and/or auto-generation by the system. Thus, while attending a live event or performance, any of a variety of methods, including but not limited to Short Message Service (SMS) and instant messaging, are used by a user to communicate these keywords to the system, to indicate user interest in the associated content. Receipt by the system of the keywords from the user triggers the system to retrieve the relevant pieces of content, associate said content with the user making the request, and to take the designated actions if appropriate. In addition, users may designate that the system retrieve the relevant pieces of content and associate said content with other users.

20 Claims, 12 Drawing Sheets

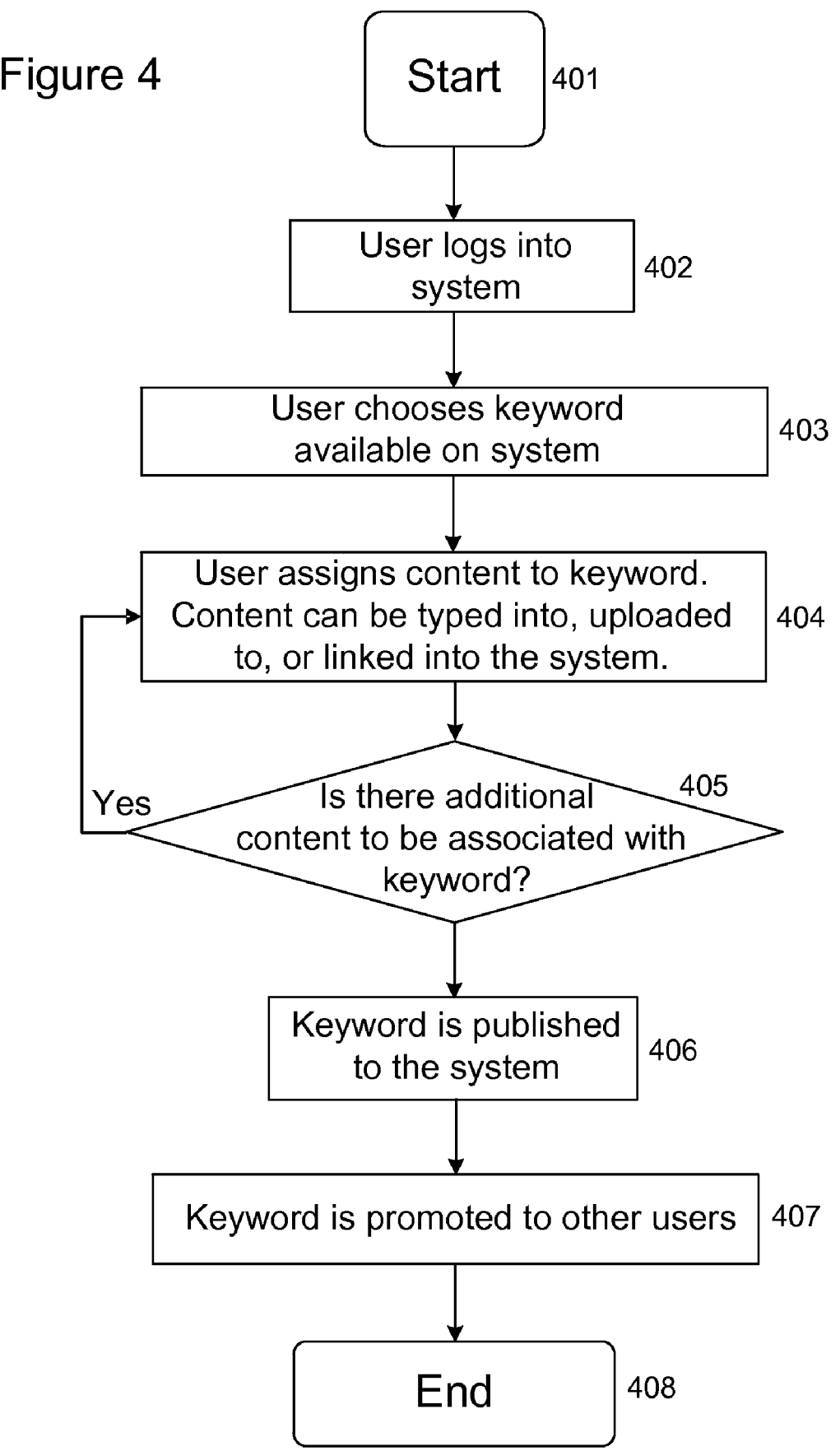

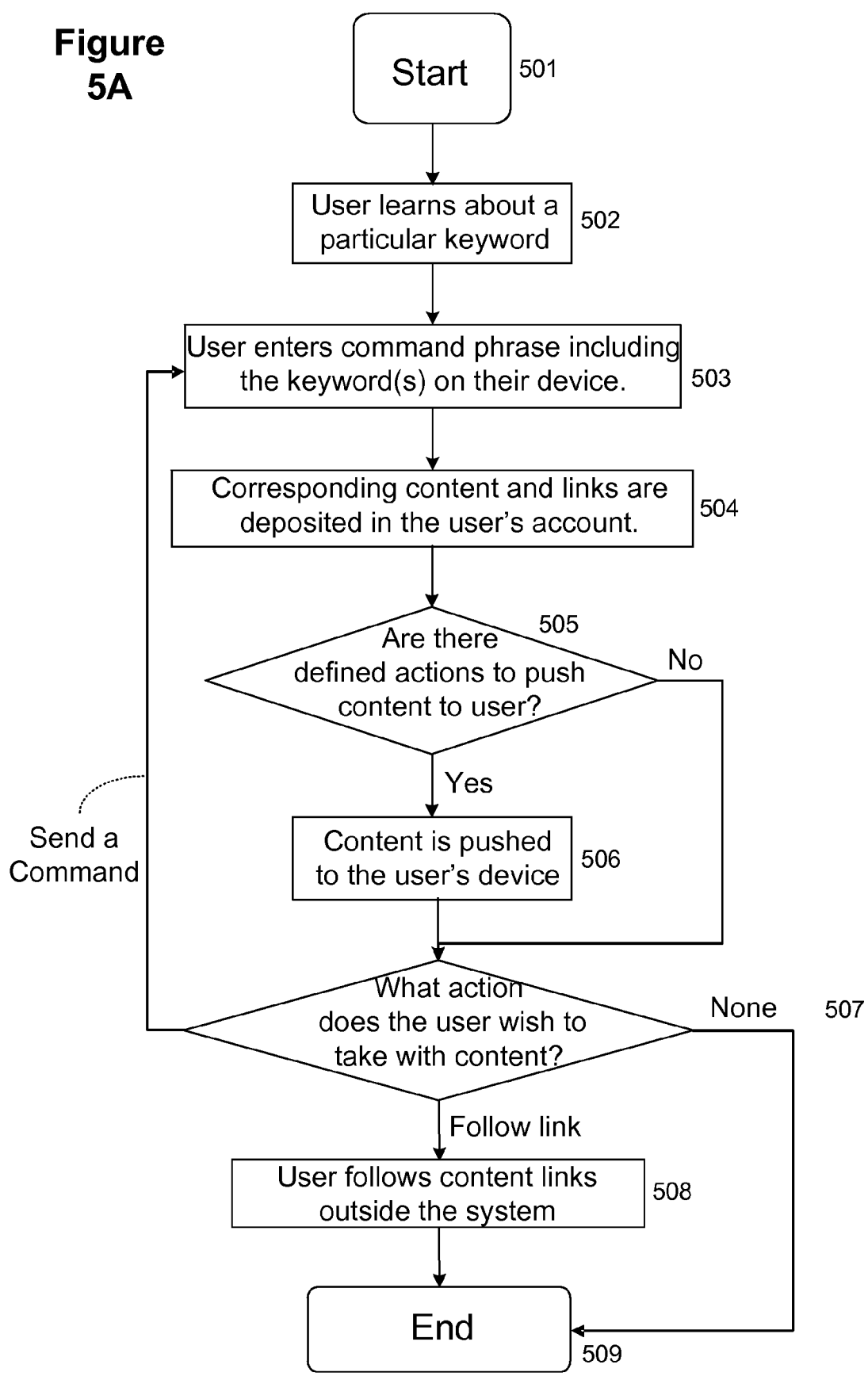

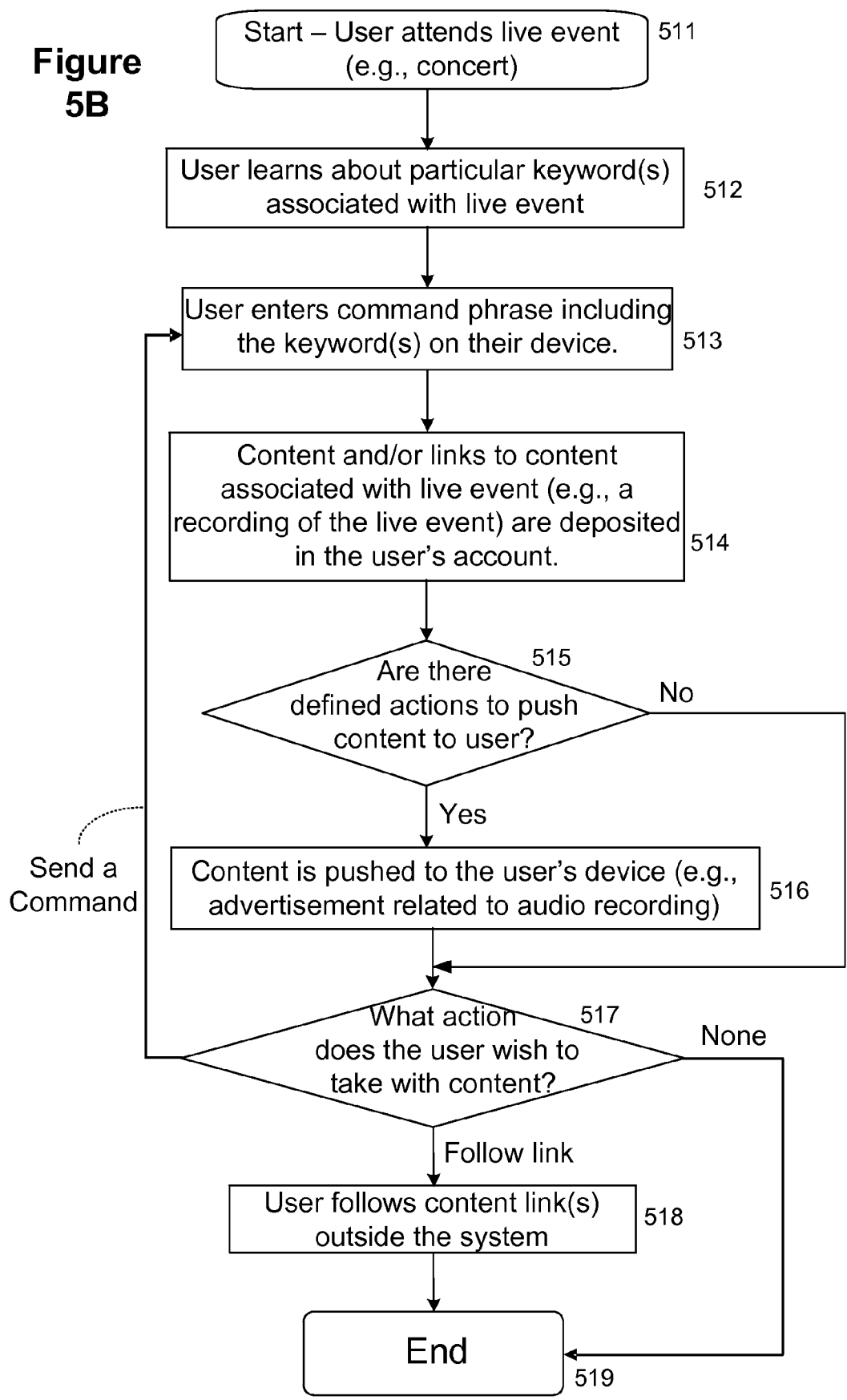

METHOD, SYSTEM, AND MEDIUM FOR SHARING DIGITAL CONTENT AND PURCHASING PRODUCTS AT LIVE PERFORMANCES

FIELD OF THE INVENTION

The present invention relates to systems and methods for live content or event management that include use of a system and/or a set of services that assign one or more keywords and/or passwords to live content, e.g., through the use of tags, to achieve any of storage, configuration, retrieval or other action by an owner with respect to the live content and/or the user.

BACKGROUND

The explosive growth in digital content and e-commerce in the nineties and the present decade has been accompanied by a number of systems and corresponding processes for storing, managing and retrieving content in various electronic formats and in a variety of ways. Storing and managing all types of content, including documents, images, video, audio and the like, typically occurs inside of a content management application incorporating some type of a database, and which may be operated in a private network or on the Internet. With existing systems, retrieving the digital content from oneself or another content owner typically requires a person either to search for a document on a personal computer, a private network or the Internet, or to provide contact information (an Internet address, email address or instant message identifier) to the content owner so that the digital content can be delivered, received and enjoyed by that person.

Likewise, commercial transactions on the Internet or over the phone typically occur in a one-to-one setting in which a buyer must conduct a transaction on a seller's own website or by speaking to a live operator. When doing so, the buyer must enter, re-enter or store a significant amount of personal information. Moreover, when a consumer sees something outside the Internet, like a seller's offline advertisement, such as a billboard, magazine or elsewhere, the consumer must almost always visit the Internet, place a voice telephone call, or visit a seller's physical site. In many cases the buyer is repeatedly shopping from the same seller and repeating many of the same time-consuming steps to conduct a transaction. Another example of this is live music being rendered during a concert. The live music has high relevance to fans of the performing artist while the live music is being played, but afterwards, or the next morning, a user may forget to go to the performing artist's web site to learn about content opportunities associated with the concert. The separation of the user from the live music itself causes the user to lose interest in the live content or associated content.

At the same time as the amount of content and e-commerce expands dramatically, people are increasingly relying on mobile devices as a primary means to communicate via voice, text, Internet enabled browsers or Internet enabled services like instant messaging. It can be appreciated that mobile devices are generally used because they are portable and convenient, and they are becoming near ubiquitous in their adoption by people all over the world. Yet, mobile devices, such as mobile phones, are often limited in their ability to navigate, retrieve and act on content or other data due to their portability, and corresponding limited input interface and storage capacities. With the enormous growth in both content availability and e-commerce, there is thus an emerging need on the part of content owners and commerce providers to obtain the content or conduct a transaction in a simple, convenient, accurate and cost effective way.

Some existing services seek to connect requests for digital content or data to the direct delivery of content or data to the mobile device for immediate use or action, which the user may or may not be ready to take. Thus, there is an inherent disconnect in such systems between what the user may want and the ultimate timing of the delivery of the content by the content owner. In addition, these services lack an efficient way to communicate a request for specific information about which the user has just learned. Two main problems thus present themselves with respect to such existing systems. First, such systems are inefficient because they are overloaded with unwanted or irrelevant amounts of digital content or data. Second, such systems are dramatically limited in terms of the actions that a user may take with respect to such digital content or data.

Additionally, today's user interfaces that are presented to users on most mobile devices are not adequate for easy and complete free form text entries. Most mobile devices have a twelve digit number pad which is cumbersome to the user when the user is faced with typing in text like web addresses, email addresses, or other contact information. Consequently, mobile users have difficulty capturing information quickly and completely in a text form on their mobile device. In turn, passing relevant information from the user's mobile phone along to friends or other contacts is not easy and similarly, taking other action with respect to the information, such as buying a physical or digital product or service, is a difficult process if such other action is even possible for the user.

Thus, there is a need for an improved method for (a) a user to request and obtain digital content or data in which the user knows she is interested, e.g., where the user is present at a live performance or event in real time, (b) to store the requested digital content or data for immediate or later access by the user, and (c) to allow the user to take immediate or later action against the digital content or data. Likewise, owners of the digital content or data are currently in need of improved ways to track requests for, and use of, such digital content or data. Further, owners of digital content or data are in need of ways to enable new methods for having targeted users take action against such digital content or data in ways that make more sense for users. These and other disadvantages of existing content management systems have thus led to an overall need for a new architecture for managing content that better aligns the interests of content owners with the interests of content consumers, and vice versa.

SUMMARY OF THE INVENTION

The present invention provides systems and methods for requesting, receiving and/or managing digital content or data in the context of live performances or events, and for taking certain types of action in connection with or with respect to the digital content or data. In various non-limiting embodiments described herein, the system matches sets of digital content or data to unique keywords associated with a live performance or event. The user of a portable device can use the portable device's existing communication capabilities to send one or more of the keywords to the system's request server. The keywords are then referenced in a database to identify the digital content or data associated with the keywords. The system retrieves the associated digital content or data from a database and stores it for immediate or later viewing or for use in performing some other action designated by the user. Based on the keywords and the identity of the user, the system may also configure the digital content or data in a particular way for that user to provide a custom content experience, or enable one or more particular actions to be taken with respect to the digital content or data. Exemplary non-limiting actions for the content that may be enabled for a user include, for instance, sharing content related to a concert being attended by the user with friend(s) or group(s) of friends, enabling purchase of item(s) via a convenient network communication protocol, such as Short Message Service (SMS) messaging, or the like.

Other features of the invention are described in more detail below.

BRIEF DESCRIPTION OF THE DRAWINGS

The content request, storage and configuration systems for live performances or events in accordance with the invention are further described with reference to the accompanying drawings in which:

FIG. 4 illustrates an exemplary non-limiting flow diagram of keyword/content association methods of the present invention;

FIGS. 5A and 5B illustrate exemplary non-limiting flow diagrams showing user interactions with content according to retrieval and configuration aspects of the invention;

DETAILED DESCRIPTION OF ILLUSTRATIVE EMBODIMENTS

Overview

Figure 1:
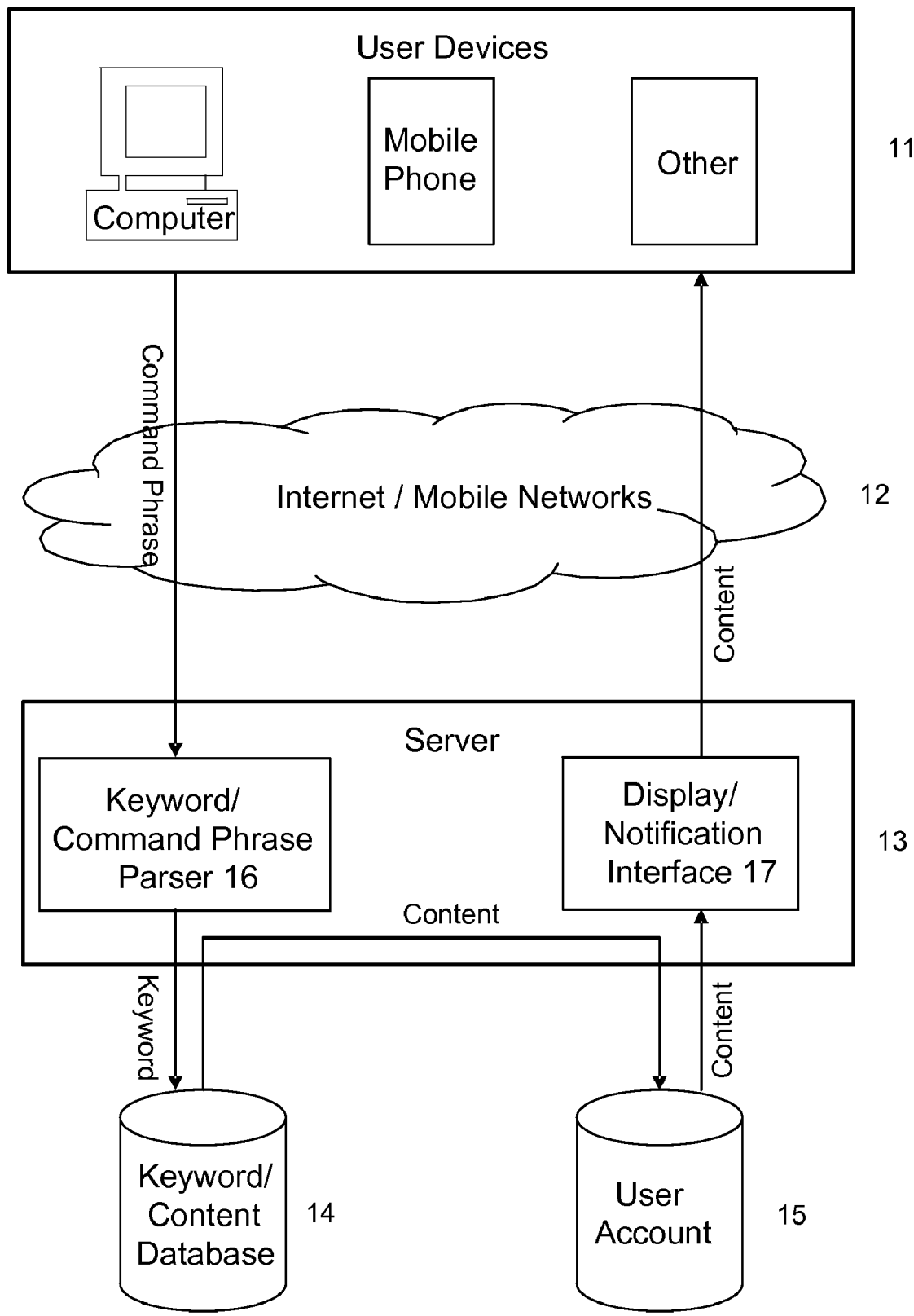
FIG. 1 illustrates a system level block diagram of the content management system of the present invention.

In consideration of the shortcomings of existing systems described above in the background, a content request, storage and configuration system for live events or performances is provided in accordance with the invention which, in the context of a live performance or event, loads and stores different types of content, associates each piece of content with one or more keywords and configures the content in particular ways for the benefit of a user. Content owners load content into the system or reference (e.g., link to) content from elsewhere, and keywords are assigned to the content by the system based on user input and/or auto-generation acts taken by the system. With a live performance or event, for instance, by using one or more pre-designated keywords associated with the live performance or event, a digital recording of the live performance or event can be made available to the user for enjoyment after the live performance or event is complete. Alternative actions might include making alternate performances or recordings of an artist or performer available for sale or review later.

In various exemplary non-limiting embodiments, a tag representing the keywords is associated with the content and stored in the system. Short Message Service (SMS), email, instant messaging, a designated entry point on a personal computer or mobile web browser, or other methods may be used by a user to communicate the one or more pre-assigned keywords in order to indicate user interest in a particular content item or items. Receipt by the system of the keywords from the user initiates identification and retrieval of relevant piece(s) of content by the system, and association of the content with the user making the request. Then, if desired by the user or if otherwise appropriate, the system operates to configure a user's account to take specific actions with respect to the content.

The user may also assign his or her own keywords to aid in the use of the system, and establish pre-defined additional actions that the system may take based on receipt of the keyword by the user. In one non-limiting embodiment, a user can send a request to purchase a particular content item or items, e.g., digital recordings of an artist or performer, with the use of keywords, the system having been pre-configured to execute a purchase transaction upon receipt of such keywords. In another non-limiting embodiment, a user can configure the system so that the send, or transmission, of the keyword triggers the deposit of the associated content in the account of another user or accounts of a group of users, or otherwise authorizes the other user(s) to interact with the content in a specified way. For instance, a friend at a live concert might want to send a digital recording of the song heard live to a friend or group of friends so that they might take further action with respect to the content, or related content. In this way, the experience of a person at a live performance or event can be spread automatically to other users who are not present at the live performance or event.

Storing, Retrieving and Configuring Digital Content in Context of Live Events

Various embodiments in which the invention may be used are described below, but as can be appreciated by one of ordinary skill in the software and networking arts, other embodiments may be utilized and structural and functional modifications may be made without departing from the scope of the content management storage, retrieval and configuration techniques of the present invention.

In the context of a live performance or event, such as, but not limited to a music concert, the present invention includes a method for requesting digital content or data via the use of keywords and a system capable of retrieving, storing and configuring digital content or data based on the keywords or identity of the user. As used herein, the term "digital content or data" related to a live performance or event includes any one or more text, audio, video, image and data files including, but not limited to, database information, information worker files, such as spreadsheet files, word processing documents, advertisements, markup language documents, such as XML, or any combination of such digital content or data.

FIG. 1 is a diagram illustrating a system with an exemplary embodiment of the present invention. Other organizations will be known to those skilled in the art and also within the scope. There is no limit on the type of digital content or data that the invention can handle though the techniques may be tailored to types of files with respect to user action against the content. One can appreciate that digital content is created in and can be converted to many different formats and may be in varying sizes, and users will have a variety of different uses for particular digital content or data.

In FIG. 1, user devices 11, such as computers, mobile phones and/or other computer devices, comprise a first operational layer of the invention. For the avoidance of doubt, portable or mobile devices in accordance with the invention include a variety of computing devices including (a) portable media players, e.g., portable music players, such as MP3 players, walkmans, etc., (b) portable computing devices, such as laptops, personal digital assistants ("PDAs"), cell phones, portable email devices, thin clients, portable gaming devices, etc., (c) consumer electronic devices, such as TVs, DVD players, set top boxes, monitors, displays, etc., (d) public computing devices, such as kiosks, in-store music sampling devices, automated teller machines (ATMs), cash registers, etc., (e) navigation devices whether portable or installed in-vehicle and/or (f) non-conventional computing devices, such as kitchen appliances, motor vehicle controls (e.g., steering wheels), etc. Finally, while some embodiments are directed to systems and method for use in portable devices, as one of ordinary skill in the art can appreciate, the techniques of the invention are by no means limited to practice on portable devices, but may also apply to standalone computing devices, such as personal computers ("PCs"), server computers, gaming platforms (e.g., Xbox), mainframes, etc.

User devices 11 are communicatively coupled via networks 12 to a set of networked services 13 (which may be a centralized server, or distributed) which provide content storage, retrieval and configuration services in accordance with the invention. The server or services 13 include a keyword/command phrase parser 16 for receiving content and keywords from content owners and users for storage or retrieval of content in or from a keyword/content database 14, respectively, by the content management system of the invention. The server or services 13 also include a display/notification interface 17 for rendering or notifying designated recipients of content retrieved in accordance with the content management techniques of the invention. User account data is also stored in storage 15, which includes configuration data and other user information as part of the user's account with the content management system of the invention. The storage techniques of the invention may also invariably be implemented across a plurality of storage components, such as databases or other storage, which may be co-located, or distributed, and of the same type of storage, or disparate types.

In operation, as described in more detail below, user devices operate to send keywords and command phrases to keyword/command phrase parser 16 for the retrieval of content for designated action based on the command phrases. The keywords are checked against the keyword/content database 14 in order to retrieve at least one set of content based on the commands of the command phrase(s) received by parser 16. Then, prior to taking action on the content, user account data in storage 15 may be further consulted to determine if there are any additional parameters (e.g., other filters on the content) that should be applied to the retrieved content based on configuration information stored for the user in accordance with the invention. Next, interface 17 takes any designated actions as specified by the commands of the command phrase(s) with respect to the resulting set(s) of content matching the user keywords and user configuration data. For instance, interface 17 may prepare the resulting set(s) of content for display on a particular user device known to have a certain type of display, or known to handle certain formats of content, i.e., the resulting content is readied for rendering on the device. Or, for another example, interface 17 may send notifications to a group of friends about the content and about certain actions (e.g., purchase) that may optionally be taken with respect to the content. Finally, the content and/or notifications are delivered to the appropriate recipient (e.g., the user in the case of a request for display of content, or the group of friends in the case of the notification example).

Figure 2A:
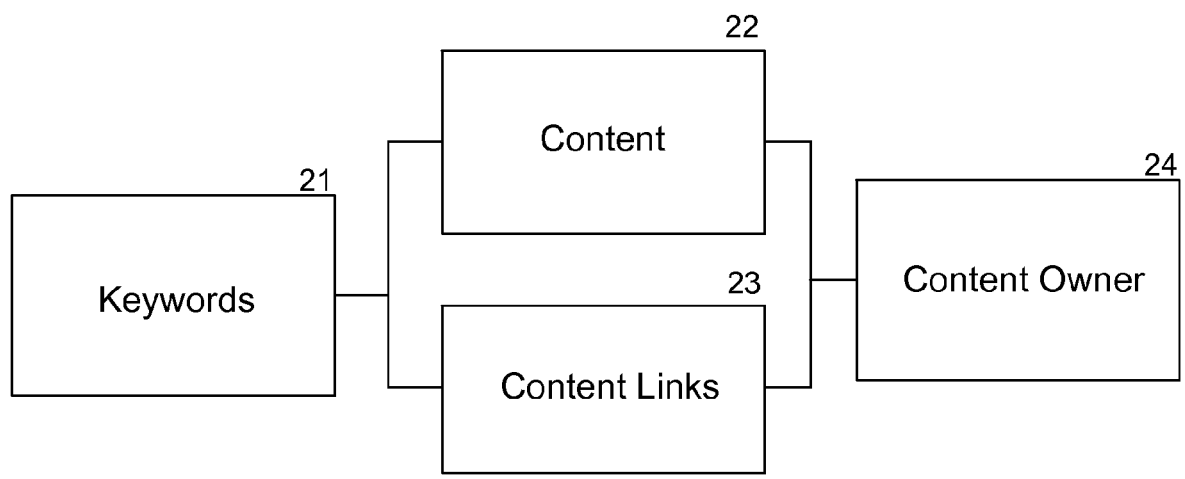
FIG. 2A illustrates a system level block diagram showing storage relationships of the system from keywords to content or content links to content owners in accordance with the invention.

A number of tables included in the database are depicted in FIG. 2A. These tables are used to identify owners of digital content or data, to associate keywords with certain types of digital content or data and to assign certain available actions that might be available to take against the digital content or data. Tables are also used to manage the assignment of keywords to digital content or data to ensure that each set of digital content or data is assigned a unique keyword or keywords. Keywords 21 can be assigned to one or more items of content 22 and one or multiple content links 23. A content owner 24 can own multiple content 22 and multiple content links 23.

Figure 2B:
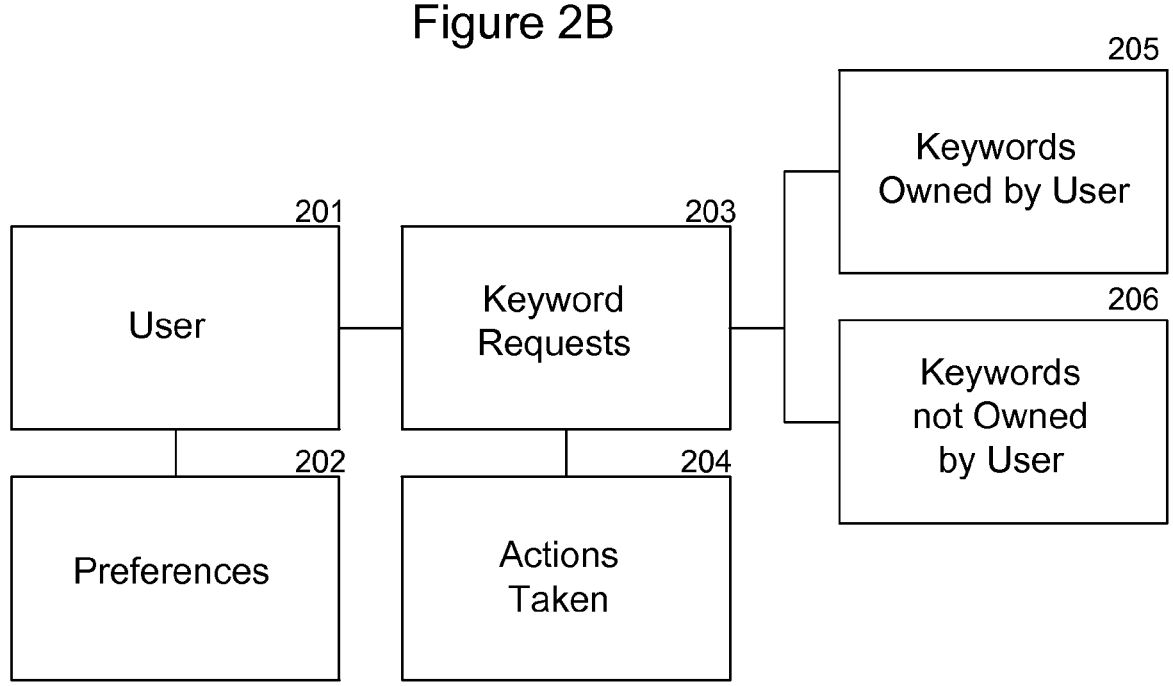
FIG. 2B illustrates exemplary aspects of keyword utilization and storage in accordance with the invention.

On the user side in FIG. 2B, tables are used to identify a user 201 with the keyword requests 203, to store preferences 202 with respect to certain types of actions that may be taken against the digital content or data, and to record historical actions 204 actually taken by the user with respect to the digital content or data. From the user's perspective, their keyword requests 203 can be either of a keyword they own 205 or a keyword they do not own 206. The sum of 205 and/or 206 results in a Keyword table 21.

Figure 3:
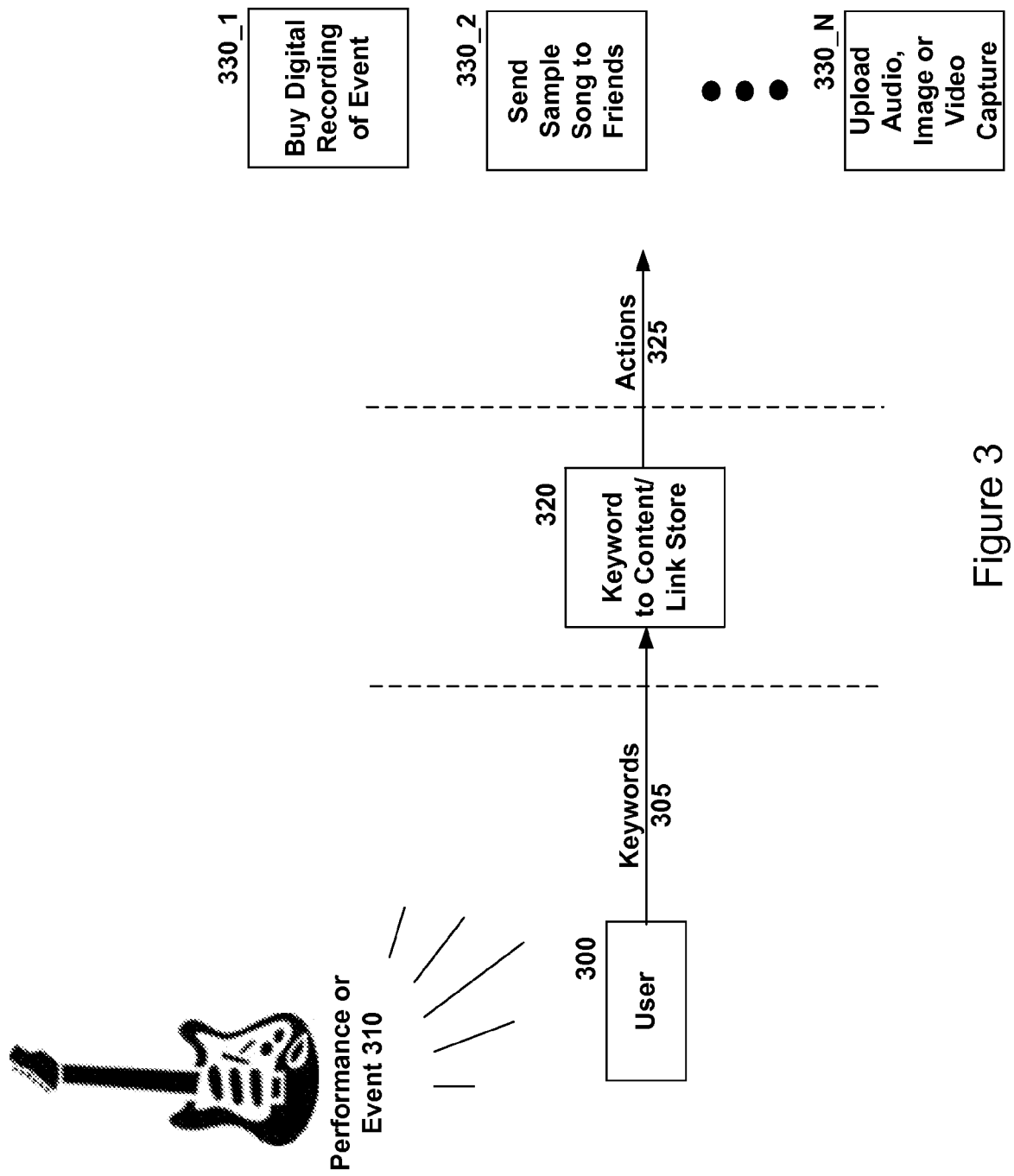
FIG. 3 is a block diagram illustrating exemplary aspects of keyword utilization and storage in the context of a live performance.

FIG. 3 is a block diagram illustrating exemplary aspects of keyword utilization and storage in the context of a live performance or event 310. A live performance or event 310 can be any performance or event that a user 300 can attend, without limitation, and thus any reference to a live musical performance as an example herein should not be considered limiting in terms of the types of different real-time content that a user 300 can be experiencing in accordance with the invention. In operation, keywords 305 empower the user 300 to perform a variety of actions 325 based on the context of the performance or event 310. Keywords 305 are pre-associated with various content and/or links related to the event 310, which various content and/or links are accessible via store(s) 320. The keywords 305 for the performance or event 310 can be either published beforehand, or published at the event 310. In one non-limiting embodiment, location technology of a user device 300, such as global positioning system (GPS) technology, optionally helps to determine or verify that user 300 is in fact attending the live performance or event 310.

A user 300 thus specifies one or more keyword(s) 305 at live performance or event 310, which are received by the system, which operates to map keyword(s) 305 to various content and/or links to content included in one or more data stores 320 related to the live performance or event 310. Advantageously, the infrastructure also optionally allows user 300 to perform one or more actions 325 contextually relevant to performance or event 310. For instance, at 330_1, a user 300 might wish to buy a digital recording of the live event 310. Another action 325 might be to send a sample song by the relevant artist to friends 330_2. As shown by 330_n, another action might be to upload content along with keywords 305 to the system (e.g., a great action photo of the performing artist). Thus, a variety of actions 330_1, 330_2, . . . , 330_N can be taken by the system.

The owner of digital content or data can use the system to upload digital content or data, shown in FIG. 4. The user, starting at 401, then logs into the system at 402 and chooses a keyword that is currently available at 403. The user then assigns content to the keyword at 404 and determines if there is additional content to be associated with the keyword at 405.

In one embodiment, the assignment of additional content that takes place at act 404 continues until the user is finished. The user then publishes the keyword at 406 to make it available for use. The keyword is then promoted to other users at 407, thereby ending the creation cycle of a keyword at 408. In addition, the owner of digital content or data may enable an integration point with the system that allows the system to retrieve the digital content or data from the owner on demand at the time it is required, and/or to take additional actions on demand. For instance, the system might signal a Web server under the control of the content owner to execute a script that the owner has designated, which script can execute any of a number of actions, for example real time queries, control over robotic systems, or registering a tally to be compared to the tallies recorded in response to other keywords. The owner may request the assignment of a keyword or keywords, or they will be assigned automatically, to the digital content or data. The database 14 depicted in FIG. 1 stores reference to the digital content, or interfaces to the digital or data, alongside tags representing the associated keyword or keywords. Digital content or data can be grouped together and may include different types of content or variations of the same content. Groups of digital content or data may share the same keyword or keywords.

By establishing a method and system for owners of digital content and data to connect the digital content or data to keywords, a much improved means of locating digital content and data is realized. There are many circumstances in which it may be beneficial for a person to obtain digital content without searching for the content, disclosing one's identity to a third or being compelled to provide a unique place of delivery and receipt such as a physical mailing address, email or fax number. The ability for a user to request digital content with keywords meets the needs and interests of users because they can enable access to the content they want when they want it in a simple and convenient way, typically via a mobile device. It also helps meet the needs of content owners, commerce providers and other organizations looking to distribute digital content or data, or have actions taken against such digital content or data, because they know the persons requesting access are genuinely interested.

A typical user experience with the invention, shown in FIG. 5A, starts with the mobile terminal at 501, although any computer may encompass the initiating source for delivery of the keywords by the user. A user will know to or be instructed to send specific keywords as a message to the server at 502. Once the user enters a command phrase, including a keyword, on their device at 503, the corresponding content and links are deposited into the user's account at 504. If there are predefined actions to push the content to the user at 505 then that content is pushed to the user's device at 506. The user decides what action to take with the content and links deposited in their account at 507 by either repeating the keyword and command phrase step returning to 503, taking no action thus ending the steps at 509, or following a content link given to them which will take them outside the system at 508.

FIG. 5B illustrates exemplary, non-limiting operation of the invention in the context of a live event or performance, starting with a user being present at a performance or event at 511. The user either knows or is instructed to send specific keywords as a message to the server at 512 relating to the performance or event. Optionally, location data about the user can trigger a service of the invention to inform users about relevant keywords. Once the user enters a command phrase, including a keyword, on their device at 513, the corresponding content and links are deposited into the user's account at 514. If there are predefined actions to push the content to the user at 515 then that content is pushed to the user's device at 516. The user decides what action to take with the content and links deposited in their account at 517 by either repeating the keyword and command phrase step returning to 513, taking no action thus ending the steps at 519, or following a content link given to them which will take them outside the system at 518.

In a preferred, but non-limiting, embodiment, the system is supported by an SMS mobile messaging platform that integrates with the multiple platforms of the cellular companies (or, for those cellular companies with an alternate preferred means of text messaging, to their equivalent of SMS), as well as a content management system. In this case, the request server receives an SMS (or equivalent) containing the keyword from a user and looks up the digital content or data that the user is requesting in the database. In another embodiment of the invention, the request server is reached through the use of an instant messaging (IM) system wherein the request server as a machine is reached as part of the IM's buddy list. In such an embodiment, the request server would appear as a buddy on the user's IM interface, which means that the user could initiate a text message conversation with the request server using the IM's existing capabilities. The user would send the keywords as a text message. In yet another embodiment, the user could use an entry field on a web based application that is directly connected to the system. In all cases, the system would realize the identity of the user, which information would be available to the system based on the method of communication selected.

Figure 6A:
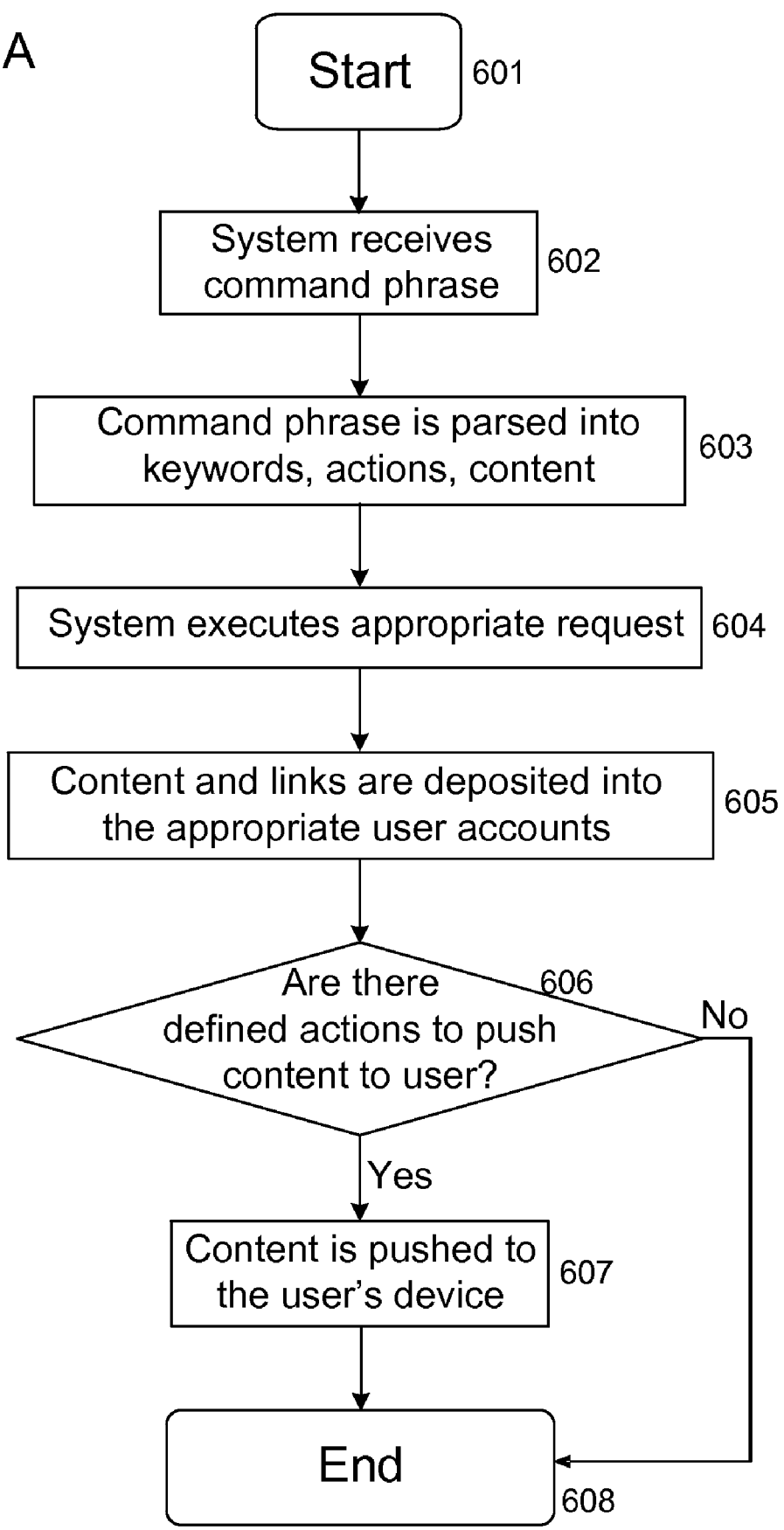
FIGS. 6A and 6B illustrate exemplary non-limiting flow diagrams showing content retrieval via keyword processes enabled by the content management systems or services of the invention.

FIG. 6A shows the system flow of the keyword/content processing. The system begins at 601 and then receives a command phrase at 602. This command phrase is parsed into keywords, actions, and content at 603 by the system. The system then executes the appropriate request at 604 and content and/or link(s) are deposited into the appropriate user accounts at 605. If there are defined actions to push content to users at 606, then the content is pushed to the user(s)' device at 607; if not, the system process ends at 608.

Figure 6B:
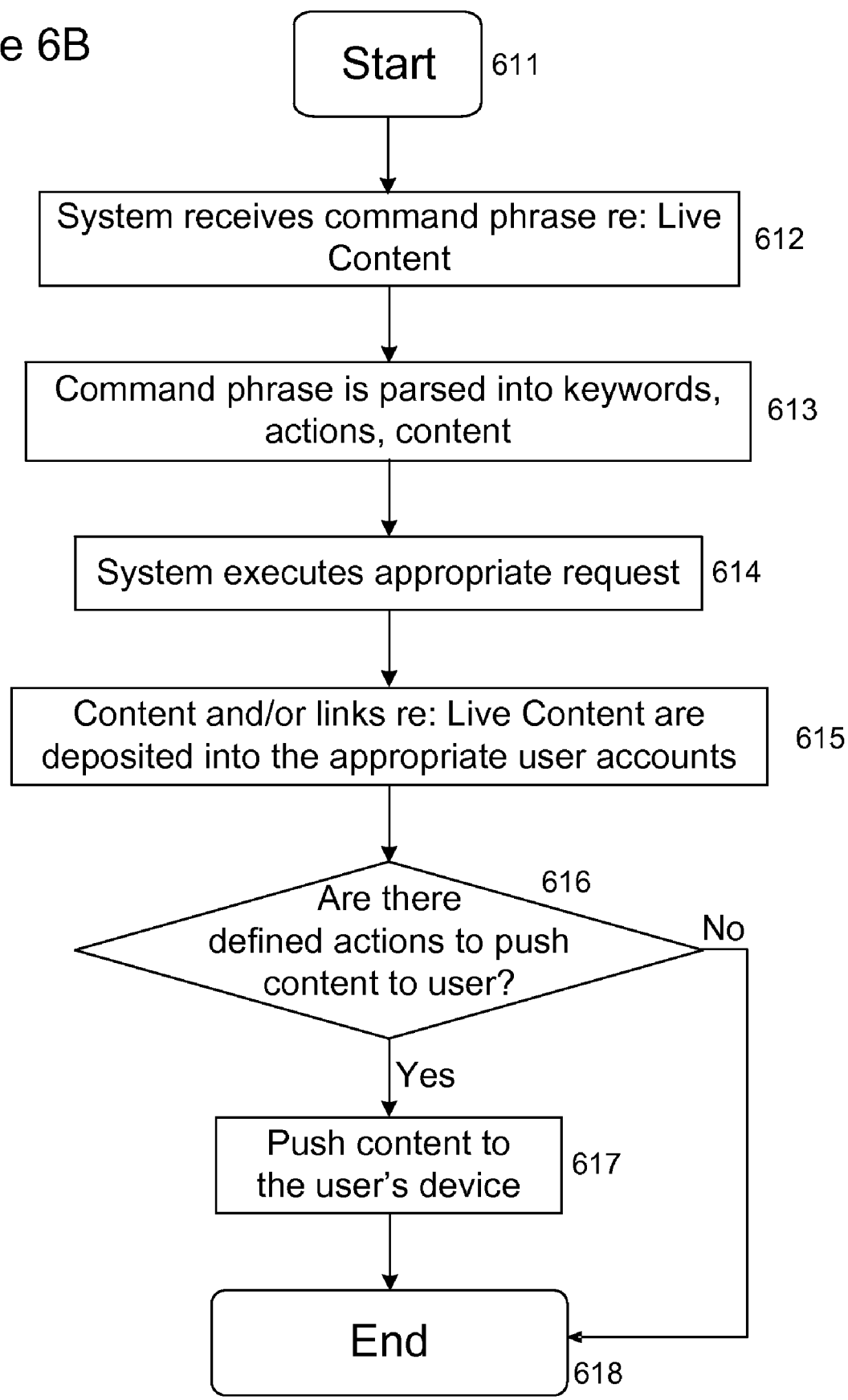

FIG. 6B shows the system flow of keyword/content processing in the context of a live performance or event. The system begins at 611 and then receives a command phrase at 612 in connection with some live content (any video, images, audio, etc., e.g., music, dance, videos, theatre, etc.). This command phrase is parsed into keywords, actions, and content/links at 613 by the system. The system then executes the appropriate request at 614 and content and/or link(s) are deposited into the appropriate user accounts at 615. If there are defined actions to push content to users at 616, then the content is pushed to the user(s)' device at 617; if not, the system process ends at 618.

Once the digital content or data is identified by its keywords, it can be presented to the user on a web-based application enabled by the system, which may be accessible via generally available web browsers on either personal computers or mobile devices. The manner in which digital content or data is displayed to the user is controlled by preferences of the owner of the digital content or data, the type of digital content or data, and the capabilities of the system. For example, a hyperlink to a url may appears as a hyperlink with brief summary information associated with the hyperlink appearing underneath. An audio file may appear only as a title of the audio file. A video may appear as a single digital image of one of the frames of the video with no title or description.

Depending on the type of digital content or data stored or integrated with system, certain actions may be available to take with respect to the content. For example, a user who is presented with the content by the system may be able to forward the content received directly to an email account or some other system. Sometimes a user may want to have the requested digital content or data delivered directly back to a mobile terminal. Other times, the user may want to have the digital content or data viewable in a web browser, or the original software application in which the digital content or data was meant to be viewed.

A user may also predefine a preference as to what to do with the digital content or data so that the system will take action with the digital content or data immediately. For example, if a user were requesting audio files from the same digital content owner repeatedly, and each time the user used the capabilities of the system to export the file to another system, the user may instead configure the system to automatically forward the audio file to another system or software application.

Digital content or data may also be configured by the system for other actions by the user. For example, the seller of shoes may enable a user to use the keyword "shoes" to deposit a hyperlink to the seller's website in the user's account for the user to obtain additional information on the particular shoes. In addition to the additional information, however, the system may also enable the user to buy the shoes without leaving the web based application, the system having configured the digital content or data to enable the ability to conduct an e-commerce transaction.

Figure 7:
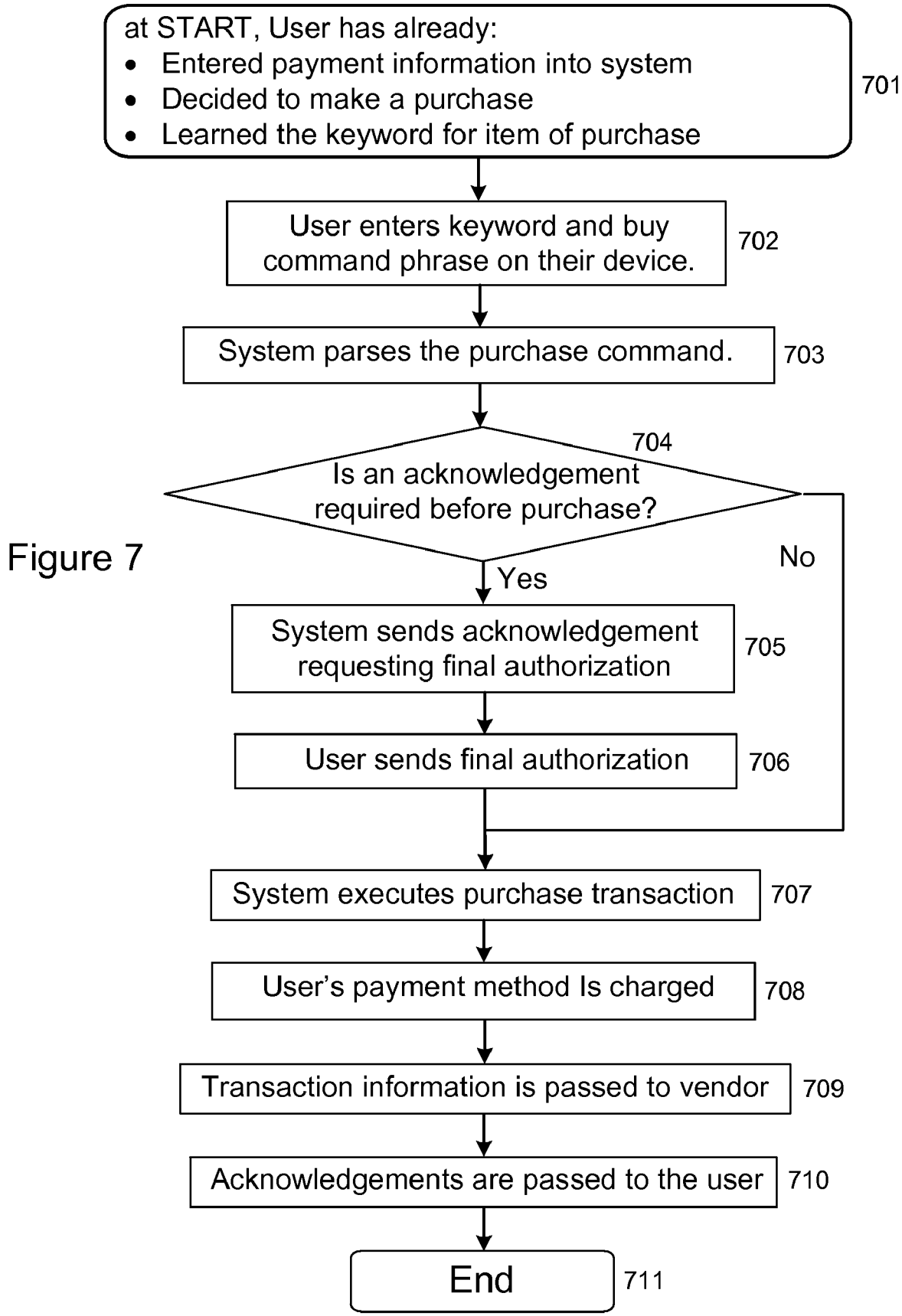
FIG. 7 illustrates an exemplary non-limiting flow diagram showing purchasing processes enabled by the content management systems or services of the invention.

The system also supports actions that can be specified at the time of submitting the keyword, to have the system process those actions directly. One category of action is the purchase of an item represented by a keyword. For instance, someone at a rock concert might want to instantly buy a T-shirt relating to the particular performance night and venue. FIG. 7 shows the action flow of such a scenario. Prior to making a purchase, the user has entered their personal payment information and preferences into the system, decided to make a purchase, and knows the keyword and command phrase for the item of interest at 701, however learned for the live performance.

When the user wants to purchase an item directly using the system, the user will enter the keyword and the buy command as one command phrase into the system at 702, e.g., "buy t-shirt," the system parses the purchase request at 703 and determines if an acknowledgement is required in order to make the purchase at 704. If so, then the system responds with a confirmation request at 705, and when the user acknowledges the confirmation at 706, the system acts as a purchasing agent by executing the purchase transaction at 707, charging the user's payment method at 708, passing the purchase and payment information securely along to the vendor at 709, returning whatever acknowledgement or receipt is necessary to the user at 710, thus completing the process at 711. If no acknowledgement is required at 704, then the system jumps to execute the transaction at 707.

Figure 8:
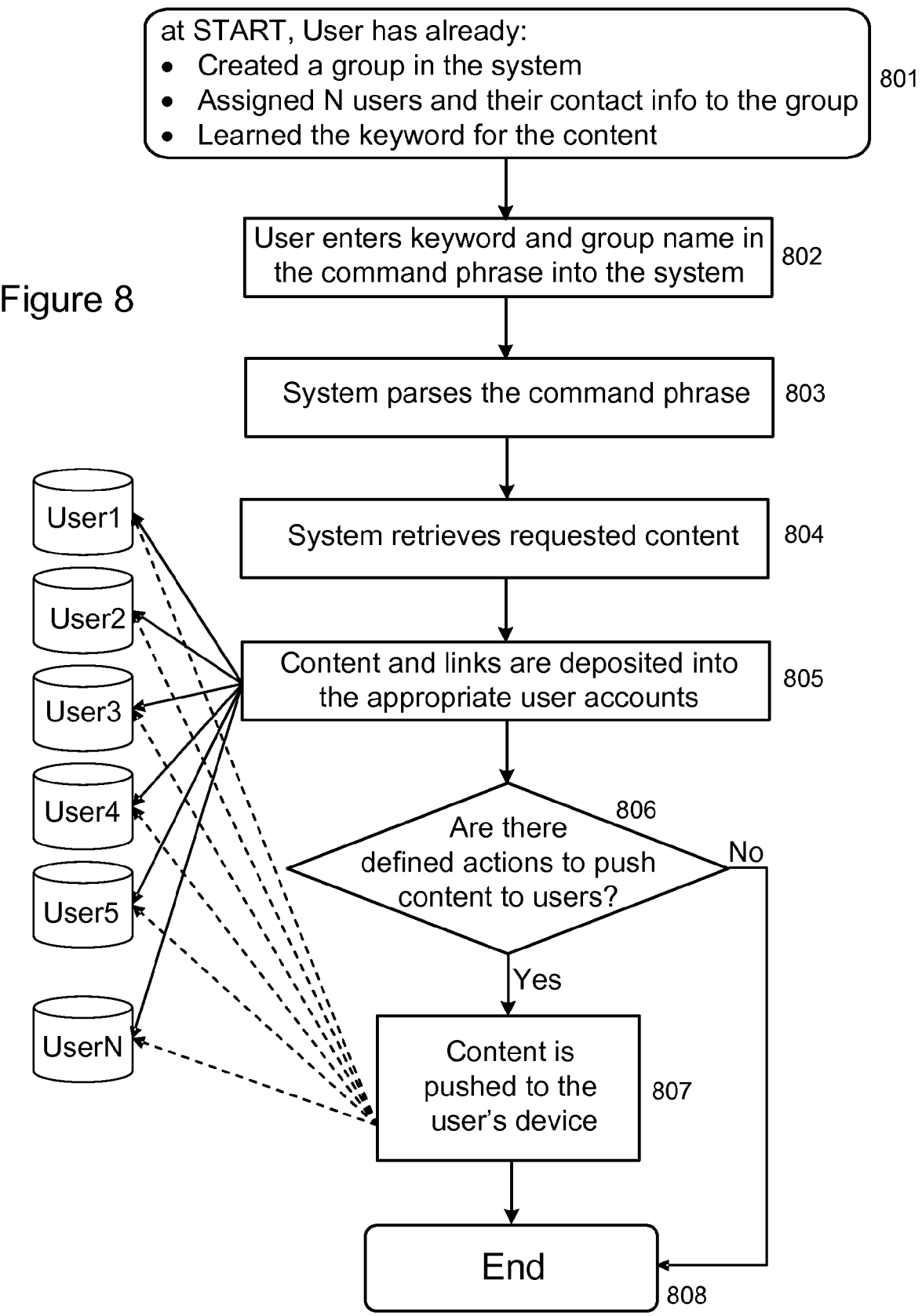
FIG. 8 illustrates an exemplary non-limiting flow diagram showing group sharing processes enabled by the content management systems or services of the invention.

Another novel use of the system is in the quick and easy dissemination of content represented by keywords to another recipient or multiple other recipients. FIG. 8 shows this scenario. In one embodiment, the user can append the keyword with a short command followed by another person's phone number, or a name linked to a pre-established phone number, as a single command, and the system will create an account for the other person, notify the person of the account's existence and associate the content related to the keyword with the other person's account. Prior to sending a multiple-recipient message, the user has defined a group name, associated a list of members and their contact information with the group name, and learned the keyword for whatever content they wish to share at 801. For instance, while attending a rock concert, a user might like to share a free promotional song from or information about the band with his or her friends automatically by sending a command keyword phrase "share bandname song."

When a user wants to pass information to multiple recipients, the user will enter the keyword and the group name in one command phrase into the system at 802. The system then parses the command phrase at 803 and retrieves the content associated with the keyword at 804 and automatically deposits the content response into the accounts or devices of all the members of the group at 805. If there are defined actions to push content to the users at 806, then the content is pushed to the device of each member of the group at 807; if not, then the process ends at 808.

By enabling a system that allows different groups to tag and manage digital content or data in a way that make it easier for other people to access, particularly in a mobile oriented world, the invention can save time, provide an improved means for privacy and reduce costs for the parties involved. The establishment of a central system ('central' from the standpoint of the users and content owners, though the services may be distributed and need not be a central set of servers) to manage and configure the requested digital content or data allows the user to rely on a single destination to manage multiple requests of multiple types of content from multiple content owners.

Exemplary Non-Limiting Network and Operating Environments

The following description sets forth some exemplary networks and non-limiting operating environments for the systems and methods for content management of the present invention. The below-described operating environments should be considered non-exhaustive, however, and thus the below-described network architectures merely show how the services of the present invention may be incorporated into some exemplary existing network structures and architectures. One can appreciate, however, that the invention may be incorporated into now existing or future alternative architectures for communication networks as well, and to systems that encompass or integrate a plurality of disparate communication networks.

The global system for mobile communication ("GSM") is one of the most widely utilized wireless access systems in today's fast growing communication systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the invention may be applied independently of the method of data transport, and do not depend on any particular network architecture, or underlying protocols.

Figure 9:
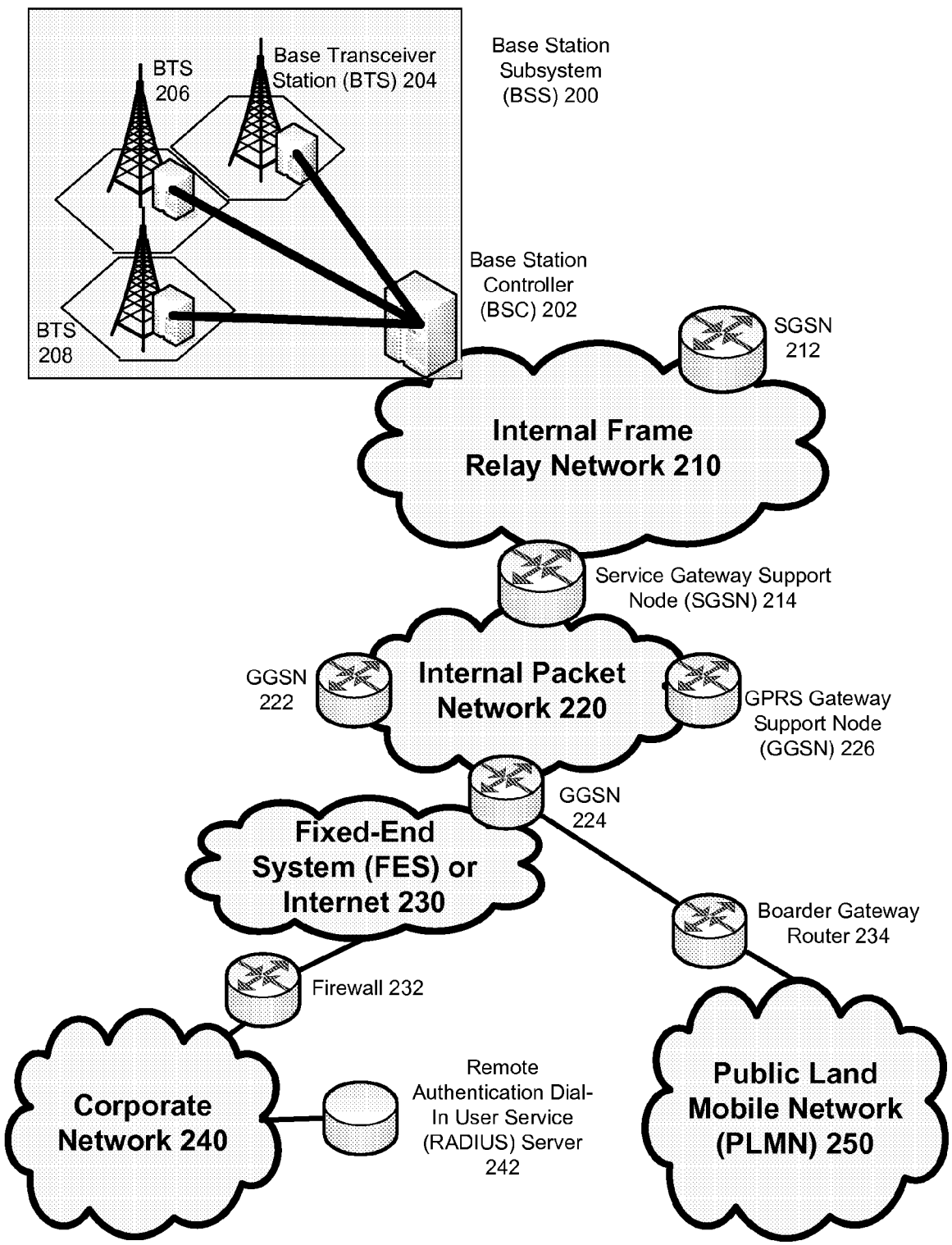
FIG. 9 illustrates an overview of a network environment suitable for service by embodiments of the invention.

FIG. 9 depicts an overall block diagram of an exemplary packet-based mobile cellular network environment, such as a GPRS network, in which the invention may be practiced. In such an environment, there are a plurality of Base Station Subsystems ("BSS") 200 (only one is shown), each of which comprises a Base Station Controller ("BSC") 202 serving a plurality of Base Transceiver Stations ("BTS") such as BTSs 204, 206, and 208. BTSs 204, 206, 208, etc. are the access points where users of packet-based mobile devices become connected to the wireless network. In exemplary fashion, the packet traffic originating from user devices is transported over the air interface to a BTS 208, and from the BTS 208 to the BSC 202. Base station subsystems, such as BSS 200, are a part of internal frame relay network 210 that may include Service GPRS Support Nodes ("SGSN") such as SGSN 212 and 214. Each SGSN is in turn connected to an internal packet network 220 through which a SGSN 212, 214, etc. can route data packets to and from a plurality of gateway GPRS support nodes (GGSN) 222, 224, 226, etc. As illustrated, SGSN 214 and GGSNs 222, 224, and 226 are part of internal packet network 220. Gateway GPRS serving nodes 222, 224 and 226 mainly provide an interface to external Internet Protocol ("IP") networks such as Public Land Mobile Network ("PLMN") 250, corporate intranets 240, or Fixed-End System ("FES") or the public Internet 230. As illustrated, subscriber corporate network 240 may be connected to GGSN 224 via firewall 232; and PLMN 250 is connected to GGSN 224 via boarder gateway router 234. The Remote Authentication Dial-In User Service ("RADIUS") server 242 may be used for caller authentication when a user of a mobile cellular device calls corporate network 240.

Generally, there can be four different cell sizes in a GSM network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

While the present invention has been described in connection with the embodiments shown in the various Figures, it is to be understood that other similar embodiments may be used or modifications and additions may be made to the described embodiment for performing the same function of the present invention without deviating therefrom. Thus, other variations and modifications to may be made without departing from the spirit or scope of the invention. For example, one skilled in the art will recognize that the present invention as described in the present application may apply to any environment, whether wired and/or wireless, and may be applied to any number of such devices connected to the system via at least one communications network and/or interacting across the network. Therefore, the present invention should not be limited to any single embodiment, but rather should be construed in breadth and scope in accordance with the appended claims.

What is claimed is:

1. A method for sharing media and purchasing products related to a live performance, the method comprising:
  confirming a user is attending a live performance by using location technology in a mobile device of the user;
  sharing digital content of the live performance while attending the live performance, wherein the sharing further comprises using the mobile device to:
    record at least one photo, video, or sound related to the live performance;
    select a keyword from a list of keywords provided by a content server;
    assign the keyword to the recording; and
    publish the keyword and recording on the content server for other mobile devices to download; and
  purchasing a product related to the live performance while attending the live performance, wherein the purchasing further comprises using the content server to:
    receive a text message from the mobile device that includes a purchase command and product keyword;
    charge the user for the product using previously stored payment information; and
    initiate delivery of the product.

2. The method of claim 1, further comprising notifying a second mobile device that the keyword and recording were published to permit the second mobile device to download the digital content.

3. The method of claim 1, wherein the live performance is a concert.

4. The method of claim 1, further comprising creating a group associated with the live performance and distributing the digital content to the group.

5. The method of claim 4, wherein the step of creating the group comprises specifying a name of the group, one or more members of the group, and contact information for the one or more members of the group.

6. The method of claim 1, wherein the step of publishing the keyword and recording further comprises receiving confirmation from the mobile device to share the digital content with other mobile devices.

7. A system for sharing media and purchasing products related to a live performance, the system comprising:
  a content server configured to:
    confirm a user is attending a live performance by using location technology in a mobile device of the user; and
    purchase a product related to the live performance while attending the live performance, wherein the purchasing further comprises using the content server to:
      receive a text message from the mobile device that includes a purchase command and product keyword;
      charge the user for the product using previously stored payment information; and
      initiate delivery of the product; and
  a user device configured to:
    share digital content of the live performance while attending the live performance, wherein the sharing further comprises using the mobile device to:
      record at least one photo, video, or sound related to the live performance;
      select a keyword from a list of keywords provided by the content server;
      assign the keyword to the recording; and
      publish the keyword and recording on the content server for other mobile devices to download.

8. The system of claim 7, wherein the content server is further configured to notify a second mobile device that the keyword and record were published to permit the second mobile device to download the digital content.

9. The system of claim 7, wherein the live performance is a concert.

10. The system of claim 7, wherein the content server is further configured to create a group associated with the live performance and distribute the digital content to the group.

11. The system of claim 10, wherein creating a group associated with the live performance comprises specifying a name of the group, one or more members of the group, and contact information for the one or more members of the group.

12. The system of claim 7, wherein the content server is further configured to receive confirmation from the mobile device to share the digital content with other mobile devices.

13. At least one computer-readable storage medium comprising computer executable instructions that, when executed by at least one computer, cause the at least one computer to perform the following steps:
- confirming a user is attending a live performance by using location technology in a mobile device of the user;
- sharing digital content of the live performance while attending the live performance, wherein the sharing further comprises using the mobile device to:
  - record at least one photo, video, or sound related to the live performance;
  - select a keyword from a list of keywords provided by a content server;
  - assign the keyword to the record; and
  - publish the keyword and recording on the content server for other mobile devices to download; and
- purchasing a product related to the live performance while attending the live performance, wherein the purchasing further comprises using the content server to:
  - receive a text message from the mobile device that includes a purchase command and product keyword;
  - charge the user for the product using previously stored payment information; and
  - initiate delivery of the product.

14. The at least one computer-readable storage medium of claim 13, further comprising notifying a second mobile device that the keyword and recording were published to permit the second mobile device to download the digital content.

15. The at least one computer-readable storage medium of claim 13, wherein the live performance is a concert.

16. The at least one computer-readable storage medium of claim 13, further comprising creating a group associated with the live performance and distributing the digital content to the group.

17. The at least one computer-readable storage medium of claim 16, wherein the step of creating the group comprises specifying a name of the group, one or more members of the group, and contact information for the one or more members of the group.

18. The at least one computer-readable storage medium of claim 13, wherein the step of publishing the keyword and recording further comprises receiving confirmation from the mobile device to share the digital content with other mobile devices.

19. The at least one computer-readable storage medium of claim 13, wherein the product is a digital product.

20. The at least one computer-readable storage medium of claim 13, wherein delivery of the product comprises depositing the digital product into an account associated with the user.

* * * * *

UNITED STATES PATENT AND TRADEMARK OFFICE
CERTIFICATE OF CORRECTION

| | | |
|---|---|---|
| PATENT NO. | : 7,680,699 B2 | Page 1 of 1 |
| APPLICATION NO. | : 11/876956 | |
| DATED | : March 16, 2010 | |
| INVENTOR(S) | : Dorrian Grant Porter, Andrew William Stack and Adrian Jeremy Tymes | |

It is certified that error appears in the above-identified patent and that said Letters Patent is hereby corrected as shown below:

TITLE PAGE, ITEM (73) ASSIGNEE:

Delete "Mozes Oncorporated" and replace with "Mozes Incorporated"

Signed and Sealed this

Thirtieth Day of October, 2012

David J. Kappos
*Director of the United States Patent and Trademark Office*